United States Patent
Ohshita et al.

(10) Patent No.: US 8,994,343 B2
(45) Date of Patent: Mar. 31, 2015

(54) SWITCHING POWER SUPPLY CIRCUIT, AND METHOD FOR CONTROL OF SWITCHING POWER SUPPLY CIRCUIT

(75) Inventors: Kazuhiro Ohshita, Shiga (JP); Norio Sakae, Shiga (JP); Toshio Yabuki, Shiga (JP)

(73) Assignee: Daikin Industries, Ltd., Osaka-Shi (JP)

( * ) Notice: Subject to any disclaimer, the term of this patent is extended or adjusted under 35 U.S.C. 154(b) by 99 days.

(21) Appl. No.: 13/579,955

(22) PCT Filed: Mar. 24, 2011

(86) PCT No.: PCT/JP2011/057185
§ 371 (c)(1),
(2), (4) Date: Aug. 20, 2012

(87) PCT Pub. No.: WO2011/118709
PCT Pub. Date: Sep. 29, 2011

(65) Prior Publication Data
US 2012/0313614 A1    Dec. 13, 2012

(30) Foreign Application Priority Data
Mar. 26, 2010  (JP) ................. 2010-071916

(51) Int. Cl.
*G05F 3/16* (2006.01)
*H02M 3/158* (2006.01)
*H02M 1/00* (2006.01)

(52) U.S. Cl.
CPC .... *H02M 3/1584* (2013.01); *H02M 2001/0032* (2013.01); *Y02B 70/16* (2013.01)
USPC ....................................... 323/225

(58) Field of Classification Search
CPC ... H02M 3/156; H02M 3/158; H02M 3/1584; H02M 7/068; G05F 1/67; H02J 1/102
USPC ............... 323/222, 225, 271, 272, 351, 299; 363/65, 67, 69; 307/58, 82
See application file for complete search history.

(56) References Cited

U.S. PATENT DOCUMENTS 5,905,369 A * 5/1999 Ishii et al. ............... 323/272
6,084,790 A * 7/2000 Wong ....................... 323/272
(Continued)

FOREIGN PATENT DOCUMENTS

JP     11-289766 A    10/1999
JP     2006-136046 A   5/2006
(Continued)

OTHER PUBLICATIONS

Qian et al., "Turn-off Switching Loss Model and Analysis of IGBT under Different Switching Operation Modes", IEEE, 1995, pp. 240-245.

*Primary Examiner* — Gary L Laxton
*Assistant Examiner* — Alex Torres-Rivera
(74) *Attorney, Agent, or Firm* — Birch, Stewart, Kolasch & Birch, LLP

(57) ABSTRACT

A circuit includes a reactor, a diode, and a switching element. The reactor and the diode are connected in series with each other on a power supply line. The switching element is provided between a power supply line and a point between the reactor and the diode. A circuit includes a reactor, a diode, and a switching element. The reactor and the diode are connected in series with each other on a power supply line. The switching element is provided between the power supply line and a point between the reactor and the diode. Characteristics of at least any of the reactors, the switching elements, and the diodes are different from each other.

16 Claims, 9 Drawing Sheets

(56) References Cited

U.S. PATENT DOCUMENTS

| | | | |
|---|---|---|---|
| 8,564,982 B2* | 10/2013 | Song et al. | 363/44 |
| 2005/0088864 A1* | 4/2005 | Montorsi et al. | 363/125 |
| 2006/0208711 A1* | 9/2006 | Soldano et al. | 323/225 |
| 2009/0168475 A1 | 7/2009 | Hirosawa | |
| 2010/0226149 A1* | 9/2010 | Masumoto | 363/20 |
| 2011/0132899 A1* | 6/2011 | Shimomugi et al. | 219/620 |

FOREIGN PATENT DOCUMENTS

| | | |
|---|---|---|
| JP | 2006-187140 A | 7/2006 |
| JP | 2007-195282 A | 8/2007 |
| JP | 2008-86107 A | 4/2008 |
| JP | 2009-159727 A | 7/2009 |
| JP | 2009-163948 A | 7/2009 |
| WO | WO 2010/023978 A1 | 3/2010 |

* cited by examiner

F I G. 1
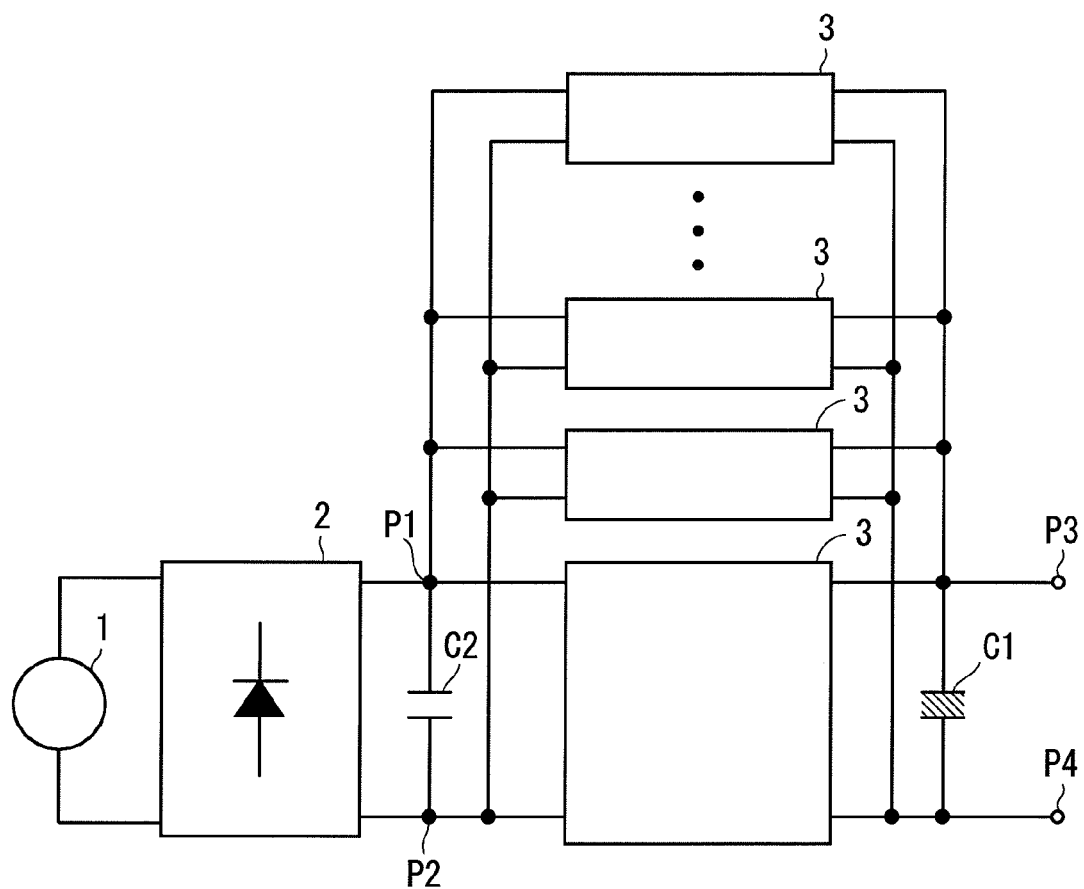

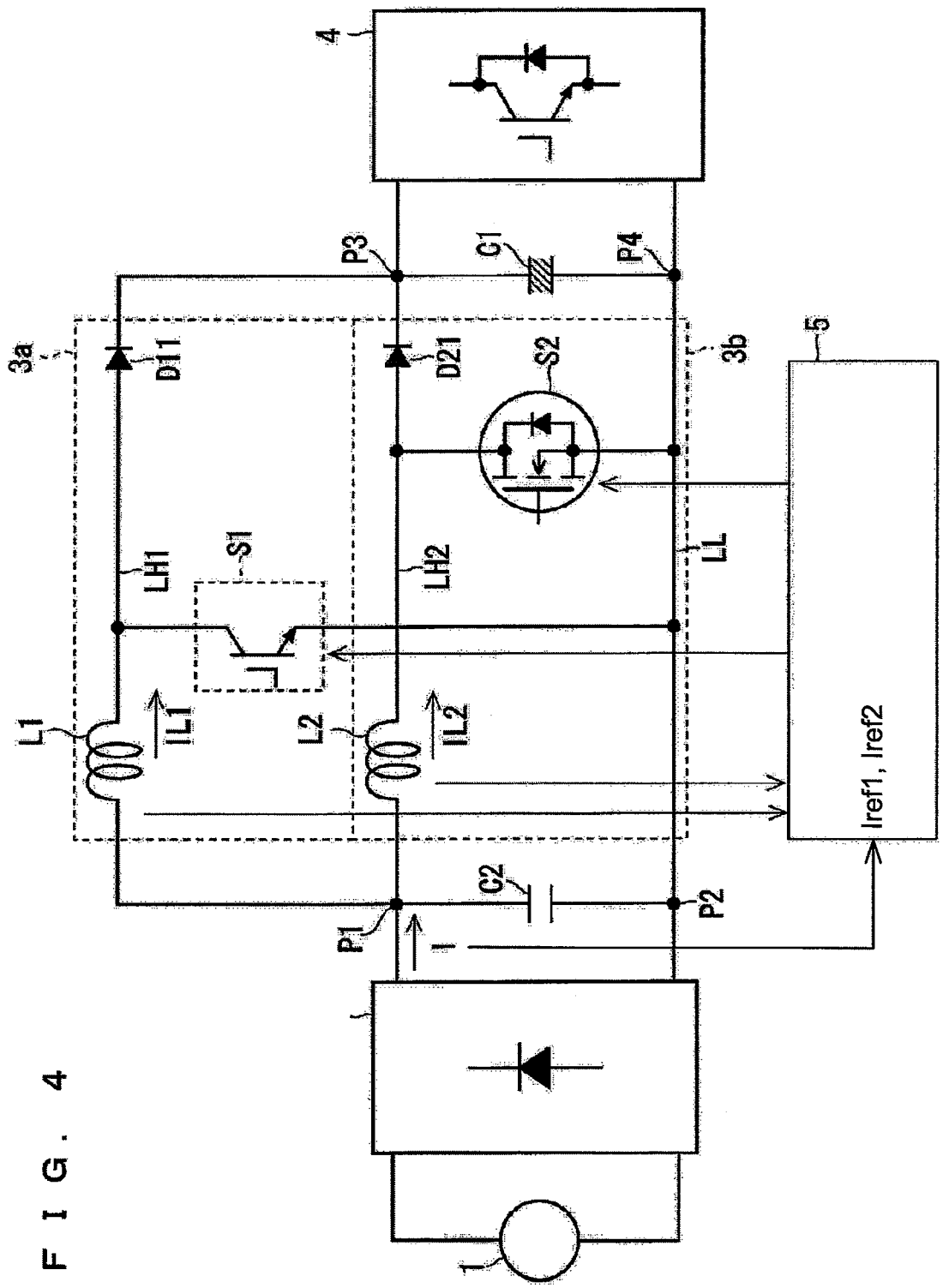
F I G . 4

SWITCHING POWER SUPPLY CIRCUIT, AND METHOD FOR CONTROL OF SWITCHING POWER SUPPLY CIRCUIT

CROSS REFERENCE TO RELATED APPLICATIONS

This application is the National Phase of International Application No. PCT/JP2011/057185, filed on Mar. 24, 2011, which claims priority under 35 U.S.C. 119(a) to Patent Application No. 2010-071916, filed in Japan on Mar. 26, 2010.

TECHNICAL FIELD

The present invention relates to a switching power supply circuit and a method for control of a switching power supply circuit, and particularly relates to a power factor correction circuit.

BACKGROUND ART

As a power factor correction circuit for correcting an input-side power factor, a circuit (so-called booster circuit) including a reactor, a diode, and a switching element has been conventionally proposed. More specifically, the reactor and the switching element are connected in series with each other between two input terminals, and the diode and the switching element are connected in series with each other between two output terminals. The diode is provided with the anode thereof directed to the switching element side. A smoothing capacitor is provided between the two output terminals.

In this circuit, when the switching element is conducting, a current flows in the input terminals via the reactor and the switching element, and when the switching element is non-conducting, a current flows in the input terminals via the reactor, the diode, and the output terminals. This increases the conducting angle of an input current, and thereby corrects an input-side power factor.

A power factor correction circuit including two such circuits has been also proposed. In such a power factor correction circuit, switching elements belonging to the two circuits are rendered conducting at different timings. This power factor correction circuit is referred to as a so-called interleave type power factor correction circuit.

Moreover, Japanese Patent Application Laid-Open No. 11-289766 (1999) is disclosed as a technique related to the present invention.

SUMMARY OF THE INVENTION

Problems to be Solved by the Invention

In the switching power supply circuit including two circuits mentioned above, there is still room for innovation from the viewpoint of electrical characteristics of the switching power supply circuit in accordance with a variation of a load of the smoothing capacitor in a case where the load varies.

Therefore, an object of the present invention is to provide a switching power supply circuit that contributes to achievement of electrical characteristics in accordance with a variation of a load.

Means for Solving the Problems

A first aspect of a switching power supply circuit according to the present invention includes: first and second input terminals (P1, P2); first and second output terminals (P3, P4); a second power supply line (LL) connecting the second input terminal and the second output terminal to each other; and a plurality of circuits (3, 3a, 3b), wherein each of the plurality of circuits includes: a first power supply line (LH1, LH2) connecting the first input terminal and the first output terminal to each other; a reactor (L1, L2) provided on the first power supply line; a diode (D11, D21) connected in series with the reactor on the first power supply line and arranged with an anode thereof directed toward the reactor; and a switching element (S1, S2) provided between the second power supply line and a point between the reactor and the diode, and wherein characteristics of the reactor of one of the plurality of circuits and the reactor of another of the plurality of circuits are different from each other, or characteristics of the switching element of the one of the plurality of circuits and the switching element of the another of the plurality of circuits are different from each other, or characteristics of the diode of the one of the plurality of circuits and the diode of the another of the plurality of circuits are different from each other.

A second aspect of a switching power supply circuit according to the present invention is the switching power supply circuit according to the first aspect, wherein the switching element (S1) belonging to the one of the plurality of circuits (3a) is an insulated gate bipolar transistor, and the switching element (S2) belonging to the another of the plurality of circuits (3b) is a MOS field effect transistor.

A third aspect of a switching power supply circuit according to the present invention is the switching power supply circuit according to the first aspect, wherein the switching element (S1) belonging to the one of the plurality of circuits (3a) is formed of a silicon carbide semiconductor or a gallium nitride semiconductor, and the switching element (S2) belonging to the another of the plurality of circuits (3b) is formed of a silicon semiconductor.

A fourth aspect of a switching power supply circuit according to the present invention is the switching power supply circuit according to any one of the first to third aspects, wherein an impedance of the reactor (L1) belonging to the one of the plurality of circuits (3a) is lower than an impedance of the reactor belonging to the another of the plurality of circuits (3b).

A first aspect of a method for control of a switching power supply circuit according to the present invention is a method for control of the switching power supply circuit according to any one of the first to fourth aspects, the method including performing: a first step of keeping the switching element (S1, S2) belonging to each of the plurality of circuits (3a, 3b) non-conducting; and a second step of when a current flowing in the first and second input terminals (P1, P2) exceeds a first predetermined value (Iref1), repeatedly switching conducting/non-conducting of the switching element (S1) belonging to the one of the plurality of circuits (3a).

A second aspect of a method for control of a switching power supply circuit according to the present invention is the method for control of the switching power supply circuit according to the first aspect, wherein in the second step, the conducting/non-conducting of the switching element (S1) belonging to the one of the plurality of circuits (3a) is repeatedly switched based on a first DC voltage command value that is higher than a voltage between the first and second output terminals (P3, P4) in the first step.

A third aspect of a method for control of a switching power supply circuit according to the present invention is the method for control of the switching power supply circuit according to the first or second aspect, further including performing a third step of, when the current flowing in the first and second input terminals (P1, P2) exceeds a second predetermined value (Iref2) that is higher than the first predetermined value (Iref1), repeatedly switching conducting/non-conducting of the switching element (S1) of the one of the plurality of circuits (3a) and the switching element (S2) of the another of the plurality of circuits (3b).

A fourth aspect of a method for control of a switching power supply circuit according to the present invention is the method for control of the switching power supply circuit according to the third aspect, wherein in the third step, the conducting/non-conducting of the switching element (S1) of the one of the plurality of circuits (3a) and the switching element (S2) of the another of the plurality of circuits (3b) is repeatedly switched based on a second DC voltage command value that is higher than the first DC voltage command value.

A fifth aspect of a method for control of a switching power supply circuit according to the present invention is the method for control of the switching power supply circuit according to any one of the first to fourth aspects, further including, prior to the first step and the second step, performing: a fourth step of keeping the switching element (S1, S2) belonging to each of the plurality of circuits (3, 3a, 3b) non-conducting, and obtaining a first relationship between the current and an efficiency of the switching power supply circuit; and a fifth step of repeatedly switching conducting/non-conducting of the switching element (S1) of the one of the plurality of circuits (3a) based on the first DC voltage command value, and obtaining a second relationship between the current and an efficiency of the switching power supply circuit, wherein the current that gives the same efficiency both in the first relationship and in the second relationship is adopted as the first predetermined value (Iref1).

Effects of the Invention

As for the first aspect of the switching power supply circuit according to the present invention, a description will be given below with an example case where the plurality of circuits are two first and second circuits.

The characteristics of at least one of the reactor, the switching element, and the diode of the first circuit are different from the characteristics of at least one of the reactor, the switching element, and the diode of the second circuit. Accordingly, the electrical characteristics of the switching power supply circuit in a first state where only the first circuit is operated are different from those in a second state where only the second circuit is operated. The electrical characteristics of the switching power supply circuit in a third state where both of the first and second circuits are operated are different from the electrical characteristics in the first state and in the second state.

As described above, three types of electrical characteristics, as the switching power supply circuit, can be exhibited with the two first and second circuits.

Moreover, the electrical characteristics in the first to third states influence the power factor, the efficiency, and harmonics, respectively. Therefore, by appropriately selecting the first to third states, the power factor, the efficiency, and harmonics can be appropriately adjusted.

In this switching power supply circuit, for example, the first to third states can be appropriately selected in accordance with a variation of a load connected to the first and second output terminals. Accordingly, this contributes to achievement of the electrical characteristics in accordance with the variation of the load.

In the second aspect of the switching power supply circuit according to the present invention, the circuit having a MOS field effect transistor has a smaller current capacity than that of an insulated gate bipolar transistor, and is widely used in a television receiver or the like. This allows the use of a general-purpose component, and thus a cost is reduced.

In the third aspect of the switching power supply circuit according to the present invention, the switching element formed of a silicon carbide semiconductor or a gallium nitride semiconductor has a lower conduction loss and a higher voltage resistance than those of the switching element formed of a silicon semiconductor.

In the fourth aspect of the switching power supply circuit according to the present invention, the reactor belonging to the one of the plurality of circuits can be downsized.

In the first aspect of method for control of the switching power supply circuit according to the present invention, when the current is lower than the first predetermined value, all the switching elements are rendered non-conducting. In a state where the current is low, a switching loss occupies a large proportion of a loss occurring in the circuit, and therefore the efficiency in a state where the current is lower than the first predetermined value can be enhanced. On the other hand, when the current is higher than the first predetermined value, the conducting/non-conducting of the switching element belonging to the one of the plurality of circuits is repeatedly switched, and thereby the efficiency in this state can be improved.

In the second aspect of the method for control of the switching power supply circuit according to the present invention, a stable operation of the circuit in the second step is achieved in a range where the current is high, as compared with a control method in which the first DC voltage command value is set equal to the DC voltage in the first step. On the other hand, the efficiency of the circuit in a range where the current is low can be enhanced.

In the third aspect of the method for control of the switching power supply circuit according to the present invention, in a state where the current is low, the switching loss occupies a large proportion of the loss occurring in the circuit, and therefore the efficiency in a state where the current is lower than the second predetermined value can be enhanced. On the other hand, when the current is higher than the second predetermined value, the conducting/non-conducting of the switching elements belonging to the one and the another of the plurality of circuits is repeatedly switched, and thereby the efficiency in this state can be improved.

In the fourth aspect of the method for control of the switching power supply circuit according to the present invention, the efficiency in the third step can be improved, as compared with a control method in which the second DC voltage command value is set equal to the first DC voltage command value.

In the fifth aspect of the method for control of the switching power supply circuit according to the present invention, the first step and the second step can be selected so as to obtain the highest efficiency.

These and other objects, features, aspects and advantages of the present invention will become more apparent from the following detailed description of the present invention when taken in conjunction with the accompanying drawings.

BRIEF DESCRIPTION OF THE DRAWINGS

FIGS. 1 and 2 are diagrams showing one example of a conceptual configuration of a switching power supply circuit;

FIG. 4 is a diagram showing one example of a conceptual configuration of the switching power supply circuit;

EMBODIMENT FOR CARRYING OUT THE INVENTION

First Embodiment

As illustrated in FIG. 1, a switching power supply circuit includes a plurality of circuits 3, input terminals P1, P2, and output terminals P3, P4.

A DC voltage is applied between the input terminals P1, P2. In the illustration of FIG. 1, a diode rectifier circuit 2 is connected to the input terminals P1, P2. The diode rectifier circuit 2 rectifies an AC voltage supplied from an AC power supply 1, and applies a DC voltage obtained after the rectification between the input terminals P1, P2. Here, a potential applied to the input terminal P2 is lower than a potential applied to the input terminal P1. It is not an essential requisite that the diode rectifier circuit 2 is connected to the input terminals P1, P2. It suffices that any configuration for applying a DC voltage between the input terminals P1, P2 is connected to the input terminals P1, P2.

Each of the plurality of circuits 3 is connected to the input terminals P1, P2 and to the output terminals P3, P4. Each of the circuits 3 functions as a booster circuit to boost the DC voltage applied to the input terminals P1, P2 and also functions as a power factor correction circuit to improve an input-side power factor, as will be described later.

A smoothing capacitor C1 is provided between the output terminals P3, P4. The smoothing capacitor C1 smoothes the DC voltage boosted by each circuit 3.

A capacitor C2 may be provided between the input terminals P1, P2. The capacitor C2 can reduce a noise of a current inputted to each circuit 3.

Figure 2:
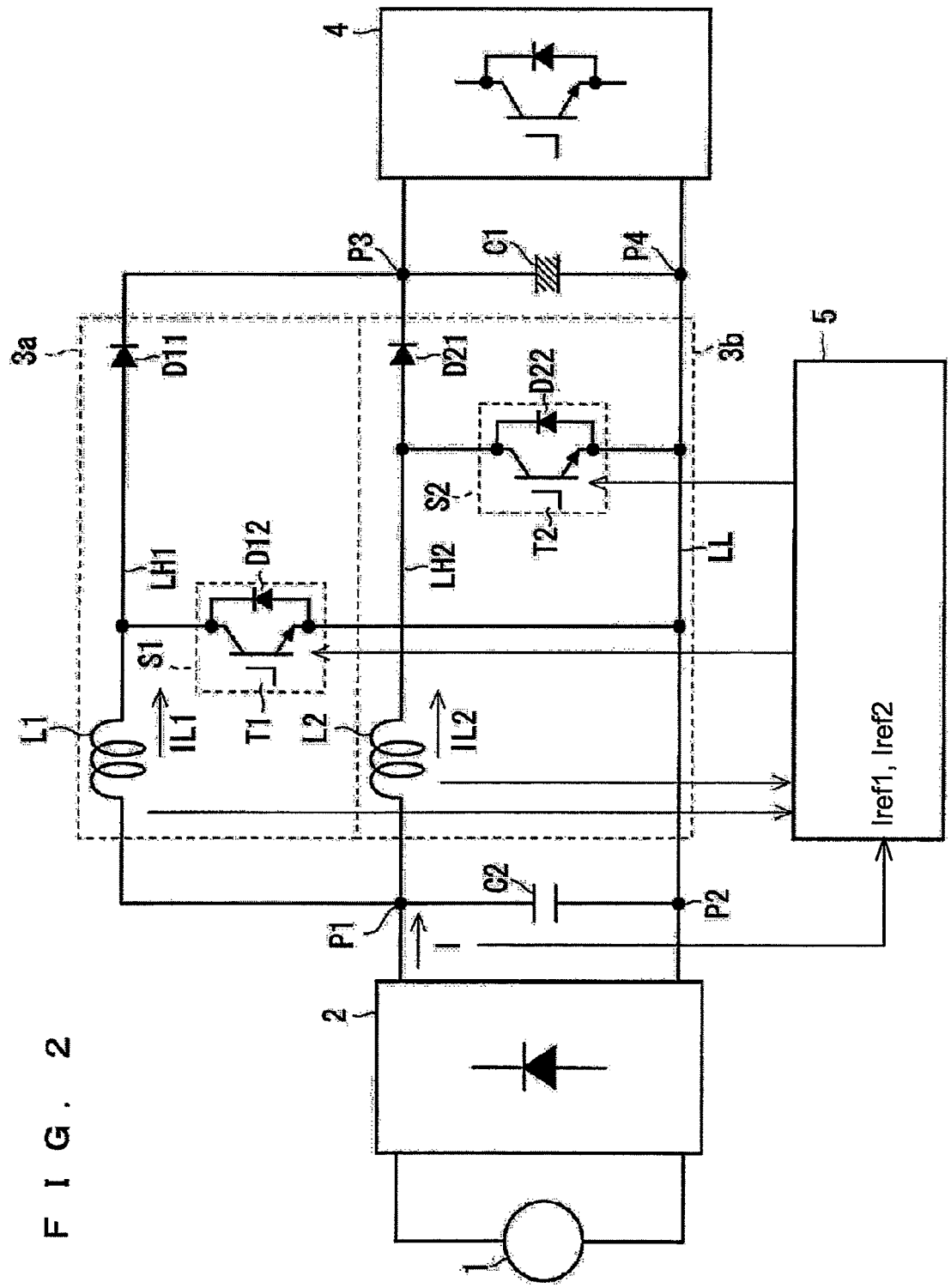

FIG. 2 conceptually shows one example of a specific configuration of the plurality of circuits 3. In FIG. 2, as an example, two circuits 3a, 3b are shown. In the illustration of FIG. 2, outputs of the circuits 3a, 3b are inputted to an inverter 4 via the smoothing capacitor C1. That is, the output terminals P3, P4 are connected to the inverter 4 at the input side of the inverter 4.

The input terminal P2 and the output terminal P4 are connected to each other by a power supply line LL.

The circuit 3a includes a power supply line LH1, a reactor L1, a diode D11, and a switching element S1. The power supply line LH1 connects the input terminal P1 and the output terminal P3 to each other. The reactor L1 is provided on the power supply line LH1. The diode D11 is connected in series with the reactor L1 at the output terminal P3 side of the reactor L1. The diode D11 is provided with the anode thereof directed to the reactor L1.

The switching element S1 is provided between the power supply line LL and a point between the reactor L1 and the diode D11. The conducting/non-conducting of the switching element S1 is controlled by the control section 5. In the illustration of FIG. 2, the switching element S1 includes a transistor T1 and a diode D12. The transistor T1 is, for example, an insulated gate bipolar transistor, and provided with an emitter electrode thereof directed to the power supply line LL side. It is not always necessary that the switching element S1 includes the transistor T1 and the diode D12. For example, it may be acceptable that the diode D12 is not provided. As the switching element S1, for example, a MOS (Metal-Oxide-Semiconductor) field effect transistor may be adopted.

The circuit 3b includes a power supply line LH2, a reactor L2, a diode D21, and a switching element S2. A connection relationship among the power supply line LH2, the reactor L2, the diode D21, and the switching element S2 is the same as the connection relationship among the power supply line LH1, the reactor L1, the diode D11, and the switching element S1. In the illustration of FIG. 2, the switching element S2 includes a transistor T2 and a diode D22. The connection relationship between the transistor T2 and the diode D22 is the same as the connection relationship between the transistor T1 and the diode D12. The diode D22 is not an essential requisite, and the switching element S2 may be, for example, a MOS field effect transistor. The conducting/non-conducting of the switching element S2 is controlled by the control section 5.

In the following, the control of the switching elements S1, S2 will be described, and a primary subject thereof is the control section 5, if not otherwise specified.

Here, the control section 5 is configured to include a micro computer and a storage device. The micro computer executes process steps (in other words, procedures) described in a program. The storage device mentioned above can be configured with, for example, one or a plurality of various storage devices such as a ROM (Read-Only-Memory), a RAM (Random-Access-Memory), a rewritable non-volatile memory (for example, an EPROM (Erasable-Programmable-ROM)), and a hard disk device. The storage device stores various types of information, data, and the like, and also stores the program executed by the micro computer, and also provides a work area for the execution of the program. It can be understood that the micro computer functions as various means corresponding to the process steps described in the program, or alternatively it can be understood that the micro computer implements various functions corresponding to the process steps. Here, the control section 5 is not limited to this, and various procedures executed by the control section 5, or various means or various functions implemented by the control section 5, may be partially or wholly implemented as hardware.

<Single Operation of Circuits 3a, 3b>

In this switching power supply circuit, it is possible to render the switching element S2 non-conducting so that the circuit 3a is singularly operated. Likewise, it is possible to render the switching element S1 non-conducting so that the circuit 3b is singularly operated. Firstly, a single operation of the circuit 3a will be described.

In the circuit 3a, when the switching element S1 is conducting, a current flows from the input terminal P1 to the input terminal P2 via the reactor L1 and the switching element S1. This current increases in accordance with a slope that is determined by an inductance of the reactor L1 and the DC voltage between the input terminals P1, P2 (see a current IL1 in FIG. 3). Due to this current, electromagnetic energy is accumulated in the reactor L1.

When the switching element S1 switches from conducting to non-conducting, a current flows from the input terminal P1 to the input terminal P2 via the reactor L1, the diode D11, and the smoothing capacitor C1 (see FIG. 1). At this time, a voltage (induced voltage) caused by the electromagnetic energy accumulated in the reactor L1 is added to the DC voltage between the input terminals P1, P2, and the sum thereof is applied to the smoothing capacitor C1. Thus, the DC voltage between the input terminals P1, P2 can be boosted, and the DC voltage obtained after the boosting can be applied to the smoothing capacitor C1.

Figure 3:
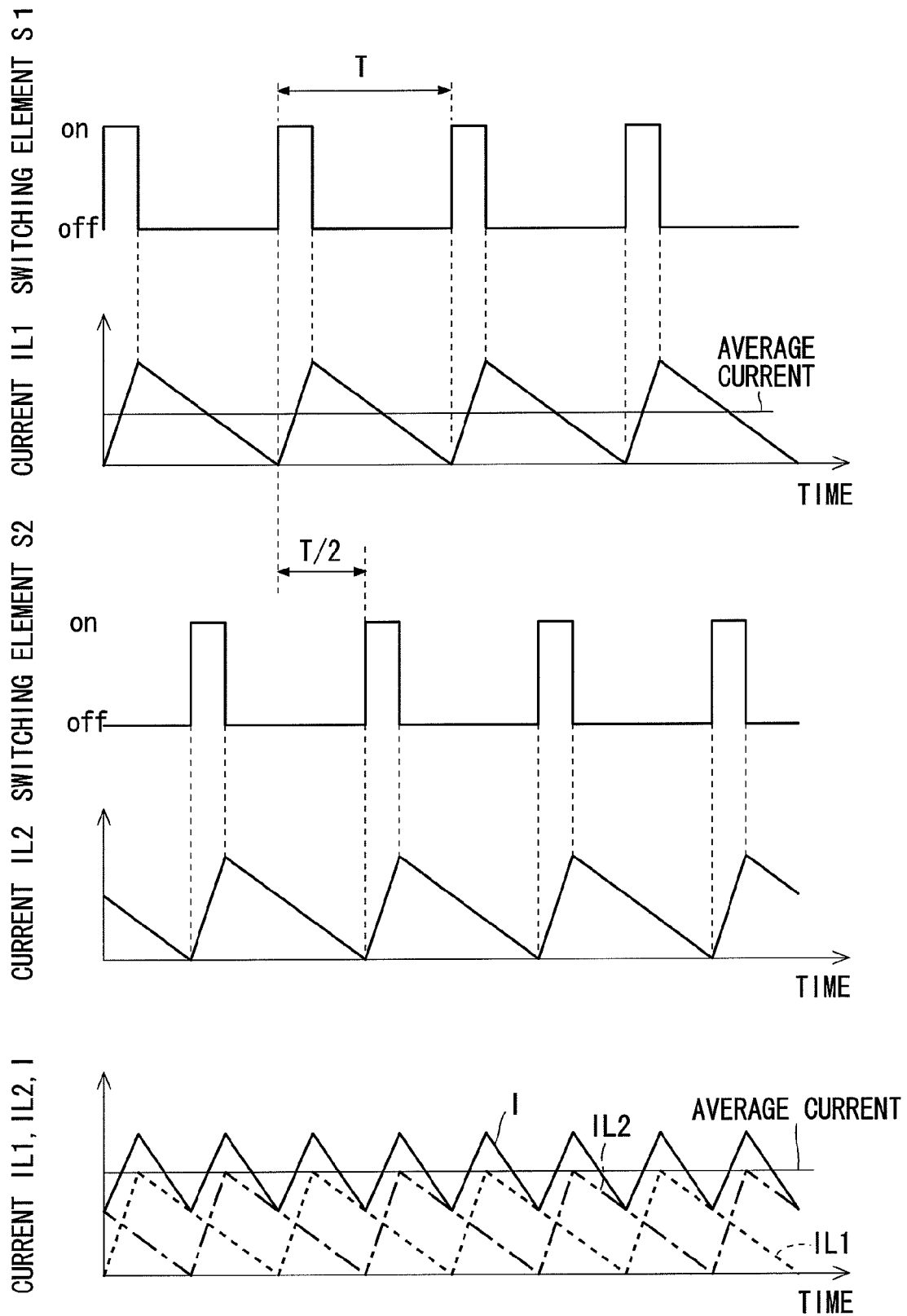
FIG. 3 is a conceptual diagram showing one example of a state of conducting/non-conducting of each switching element, currents flowing in reactors, and the sum of the currents flowing in the reactors.

This current decreases with a slope that is based on the inductance of the reactor L1, an electrostatic capacitance of the smoothing capacitor C1, and the like (see the current IL1 in FIG. 3). Then, when this current, that is, the current IL1, becomes zero, the switching element S1 is rendered conducting again. Thereafter, the above-described operation is repeated. This operation causes the current IL1 to change while exhibiting a saw-tooth-like shape. Such a mode in which the switching element S1 is rendered conducting immediately after the current IL1 flowing in the reactor L1 reaches zero is a so-called critical current mode.

As described above, the circuit 3a can function as the switching power supply circuit that boosts the voltage between the input terminals P1, P2 and applies the boosted voltage between the output terminals P3, P4. Even in a time period in which a current does not flow to the smoothing capacitor C1 (a time period in which the switching element S1 is conducting), a current flows in the diode rectifier circuit 2. Therefore, a conducting angle of the current flowing in the diode rectifier circuit 2 can be increased. In other words, the circuit 3a can function as a power factor correction circuit.

To achieve such switching of the circuit 3a, the current IL1 flowing in the reactor L1 is detected, and the detected current IL1 is inputted to the control section 5. The control section 5, for example, detects zero-crossing of the current IL1, and, from a time point when the zero-crossing is detected, outputs a switching signal to the switching element S1. Then, upon elapse of a time period determined based on an arbitrary DC voltage command value (a command value concerning the voltage between the output terminals P3, P4), the control section 5 stops the output of the switching signal.

A single operation of the circuit 3b is similar to that of the circuit 3a. Accordingly, the circuit 3b functions as a booster circuit and also functions as a power factor correction circuit. To achieve such switching of the circuit 3b, a current IL2 flowing in the reactor L2 is detected, and the detected current IL2 is inputted to the control section 5. The control section 5, for example, detects zero-crossing of the current IL2, and, from a time point when the zero-crossing is detected, outputs a switching signal to the switching element S2. Then, upon elapse of a time period determined based on an arbitrary DC voltage command value, the control section 5 stops the output of the switching signal.

Although the critical current mode is adopted in the example described above, this is not limiting. For example, it is possible that the switching element S1 or the switching element S2 is rendered conducting when the current IL1 reaches a predetermined value greater than zero. This mode is a so-called continuous current mode. It is also possible that the switching element S1 or the switching element S2 is rendered conducting when a predetermined time period has elapsed after the time point when the current IL1 reached zero. This mode is a so-called non-continuous current mode. Any of the modes is adoptable, and this is also true for other embodiments described later. In the following, however, the critical current mode will be described as a typical example.

<Cooperative Operation of Circuits 3a, 3b>

In this switching power supply circuit, the circuits 3a, 3b can be cooperatively operated. This operation is also called interleaving. In the following, details will be described.

The switching element S2 is rendered conducting when a predetermined time period (the predetermined time period may be zero) has elapsed after a time point when the switching element S1 was rendered conducting. This predetermined time period is a time period shorter than a time period (hereinafter also referred to as cycle) T from when the switching element S1 is rendered conducting to when the switching element S1 is rendered conducting again. In the illustration of FIG. 3, one half of the time period T is adopted as the predetermined time period, and a case where the half of the time period T is adopted as the predetermined time period will be described below. Since a time point when the switching element S2 is rendered conducting is determined on the basis of a time point when the switching element S1 is rendered conducting, it can be understood that the switching element S1 is a master-side switching element and the switching element S2 is a slave-side switching element.

Due to the switching described above, the circuit 3b is similarly operated with a delay of one half the cycle behind the circuit 3a. Therefore, the current IL2 flowing in the reactor L2 is delayed by one half the cycle relative to the current IL1 flowing in the reactor L1.

In a case where only the circuit 3a is singularly operated, a current I flowing in the diode rectifier circuit 2 is equal to the current IL1 flowing in the reactor L1. On the other hand, in a case where the circuits 3a, 3b are cooperatively operated, the current I flowing in the diode rectifier circuit 2 is equal to the sum of the currents IL1, IL2. In the sum, a low value portion (so-called valley) of the current IL1 is compensated by a high value portion (so-called peak) of the current IL2. In the same manner, a valley of the current IL2 is compensated by a peak of the current IL1. Accordingly, a variable component (so-called harmonic component) of the current I can be reduced (see the current I in FIG. 3). Although a shift between the cycles of the currents IL1, IL2 is not limited to one half the cycle, one half the cycle causes the greatest reduction of the harmonic component. Moreover, since the valley of the current IL1 is compensated by the peak of the current IL2, the average value of the current I is increased. In other words, the maximum value of the current I can be lowered to achieve the same average value as in a case where the circuit 3a is singularly operated.

To achieve such switching of the circuits 3a, 3b, the control section 5, for example, detects zero-crossing of the current IL1, and, from a time point when the zero-crossing is detected, outputs a switching signal to the switching element S1. Then, upon elapse of a time period determined based on an arbitrary DC voltage command value, the control section 5 stops the output of the switching signal. Concurrently with this, the control section 5 outputs a switching signal to the switching element S2 from a time point when a predetermined time period (for example, one half of the cycle) has elapsed after the time point when the zero-crossing of the current IL1 was detected, and upon elapse of a time period determined based on an arbitrary DC voltage command value, stops the output of the switching signal.

As described above, in this switching power supply circuit, each of the circuits 3a, 3b can be singularly operated, and the circuits 3a, 3b can be cooperatively operated, too. The control section 5 also has a function for switching among the single operation of the circuit 3a, the single operation of the circuit 3b, and the cooperative operation of the circuits 3a, 3b.

<Characteristics of Circuits 3a, 3b>

In this embodiment, characteristics of at least any of the switching elements S1, S2, the diodes D11, D21, and the reactors L1, L2 that belong to the circuits 3a, 3b, respectively, are different from each other. Accordingly, electrical characteristics of the circuit 3a and electrical characteristics of the circuit 3b are different from each other.

Therefore, electrical characteristics of the switching power supply circuit in a first state where the circuit 3a is singularly operated, and electrical characteristics of the switching power supply circuit in a second state where the circuit 3b is singularly operated are different from each other. Furthermore, electrical characteristics of the switching power supply circuit in a third state where the circuits 3a, 3b are cooperatively operated is different from the electrical characteristics of the switching power supply circuit in both the first state and the second state.

Therefore, in this switching power supply circuit, three types of electrical characteristics can be exhibited with the two circuits 3a, 3b. Moreover, it is possible to adopt a zeroth state where neither of the two circuits 3a, 3b are operated, that is, a state where both of the switching elements S1, S2 are non-conducting. Adoption of this enables four types of electrical characteristics to be exhibited with the two circuits 3a, 3b.

Hereinafter, examples of device characteristics different between the circuits 3a, 3b will be mentioned. For example, inductances of the reactors L1, L2, reverse recovery characteristics and forward voltages of the diodes D11, D21, conduction characteristics and gate constants of the switching elements S1, S2, and the like, may be mentioned. Each of these device characteristics influence any of the power factor, the efficiency, and harmonics included in the current, of the switching power supply circuit. Additionally, the influences of these device characteristics on the power factor, the efficiency, and the harmonics depend on a load (such as an output current and an output frequency) of the inverter 4. Therefore, it is preferable, for example, to operate the switching power supply circuit while appropriately adopting the first state, the second state, or the third state in accordance with the distinction among low, medium, and high of the load of the inverter 4 (for example, the distinction of a low range, a middle range, and a high range of the output frequency of the inverter 4). Alternatively, it is also acceptable to adopt the zeroth state, the first state, and the third state in accordance with the distinction among low, medium, and high of the load of the inverter 4, respectively. Needless to say, it is acceptable to adopt the zeroth to third states while distinguishing the load state of the inverter 4 into four ranges. Then, by appropriately setting the electrical characteristics of the switching power supply circuit in the zeroth state, the first state, the second state, and the third state, the switching power supply circuit can be operated in the most proper operation state in accordance with the load of the inverter 4. In other words, this switching power supply circuit contributes to achievement of the electrical characteristics in accordance with a variation of the load.

As described above, the circuits 3a, 3b are illustrated as the plurality of circuits 3. However, when N circuits 3 having different device characteristics are adopted, the number of combinations S thereof is represented by the following expression.

[Math. 1]

$$S = \Sigma_{n=1}^{N} {}_{N}C_{n} + 1 \qquad (1)$$

Here, ${}_{a}C_{b}$ is represented by the following expression.

[Math. 2]

$${}_{a}C_{n} = \frac{a \times (a-1) \times \ldots \times (a-b-1)}{b \times (b-1) \times \ldots \times 1} \qquad (2)$$

Accordingly, when N circuits 3 having different device characteristics are provided, S patterns of electrical characteristics of the switching power supply circuit are achieved. In other words, this switching power supply circuit contributes to achievement of the electrical characteristics in accordance with a more delicate load state. Here, some of the plurality of circuits 3 may have the same device characteristics.

FIG. 4 is a diagram showing one example of the switching power supply circuit. The switching power supply circuit illustrated in FIG. 4 is different from the switching power supply circuit illustrated in FIG. 2, in terms of two switching elements S1, S2 belonging to the circuits 3a, 3b, respectively. To be specific, the switching element S1 is an insulated gate bipolar transistor. The switching element S2 is a MOS field effect transistor. The term "MOS" has been used for the laminated structure of metal/oxide/semiconductor in the old times, and was named from the initial letters of Metal-Oxide-Semiconductor. However, especially in a field effect transistor having a MOS structure, from the viewpoint of the recent improvement in the integration and the manufacturing process etc., the materials of a gate insulating film and a gate electrode have been improved.

For example, in the MOS field effect transistor, mainly from the viewpoint of forming the source and the drain in a self-alignment manner, polycrystalline silicon, instead of a metal, has now been adopted as the material of the gate electrode. Although a material having a high dielectric constant is adopted as the material of the gate insulating film from the viewpoint of improving the electrical characteristics, this material is not limited to oxides.

Therefore, adoption of the term "MOS" is not necessarily limited to a laminated structure of metal/oxide/semiconductor, and this specification does not assume such a limitation. That is, in view of common general technical knowledge, the term "MOS" herein not only is an abbreviation derived from the word origin but also has a broad sense including a stacked structure of conductor/insulator/semiconductor.

An insulated gate bipolar transistor has, as its device characteristics, a higher conduction loss than that of a MOS field effect transistor, and has, as its device characteristics, a larger current capacity than that of a MOS field effect transistor.

Accordingly, for example, in a region where the current I is low (for example, where the load of the inverter 4 is in a low range), only the circuit 3b is singularly operated. Since the switching element S1 is not conducting in the region where the current I is low, occurrence of a conduction loss is suppressed and thus the efficiency is improved. For example, in a region where the current is medium (for example, where the load of the inverter 4 is in a middle range), only the circuit 3a is singularly operated. As a result, even if the current capacity of the switching element S2 is deficient, damage to the switching element S2 is avoided because the switching element S1 having a large current capacity is used.

For example, in a region where the current I is high (for example, where the load of the inverter 4 is in a high range), the circuits 3a, 3b are cooperatively operated. As a result, even if the current capacity of the switching element S1 is deficient because of the single operation of the circuit 3a, the current is distributed to the switching elements S1, S2 and therefore the current flowing in each of the switching elements S1, S2 is reduced. Here, in view of a difference between the current capacities of the switching elements S1, S2, it is preferable that the maximum value of the current flowing in the switching element S2 is lower than the maximum value of the current flowing in the switching element S1. This is achieved in consideration of the following two points. Firstly, when the reactor L2 has a high inductance, the slope of the current flowing in the switching element S2 (that is, the slope of increase of the current IL2) can be reduced. Secondly, when the time period in which the switching element S2 is conducting is short, the maximum value of the current flowing in the switching element S2 is lowered. Accordingly, by appropriately setting the inductance of the reactor L2 and the time period in which the switching element S2 is conducting, the maximum value of the current flowing in the switching element S2 can be made lower than the maximum value of the current flowing in the switching element S1.

The circuit 3b adopting a MOS field effect transistor as the switching element S2 is widely used in, for example, a television receiver. Therefore, since adoption of the switching element S2 that is a general-purpose component is allowed, the manufacturing cost can be reduced.

The switching element S1 may be formed of a SiC (silicon carbide) semiconductor or a GaN (gallium nitride semiconductor), and the switching element S2 may be formed of a Si (silicon) semiconductor. The switching element S1 formed of a SiC semiconductor or a GaN semiconductor has a lower conduction loss than, for example, the switching element S2 formed of a Si semiconductor. Therefore, for example, the efficiency in the first state where the circuit 3a is singularly operated is further enhanced. On the other hand, the manufacturing cost of the switching element S2 formed of a Si semiconductor is lower than the manufacturing cost of the switching element S1 formed by a SiC semiconductor or a GaN semiconductor. Therefore, the manufacturing cost can be reduced, as compared with a case where both of the switching elements S1, S2 are formed of a SiC semiconductor or a GaN semiconductor.

As the reactor L2, a reactor having a small current capacity may be adopted. That is, the wire diameter of a coil included in the reactor L2 may be reduced. This can downsize the reactor L2, and the manufacturing cost can be reduced. The circuit 3b adopting such a reactor L2 is also widely used in a television receiver or the like. Therefore, since adoption of the reactor L2 that is a general-purpose component is allowed, the manufacturing cost can be reduced.

<Air Conditioning Apparatus mounted with Switching Power Supply Circuit>

Next, a consideration will be given to a case where this switching power supply circuit is provided in an air conditioning apparatus. Here, similarly to the illustration of FIG. 2, this switching power supply circuit is provided at the input side of the inverter 4, and the inverter 4 applies an AC voltage to a motor, not shown, to control the speed of rotation of the motor. The motor drives a compressor or a fan provided in the air conditioning apparatus.

Figure 5:
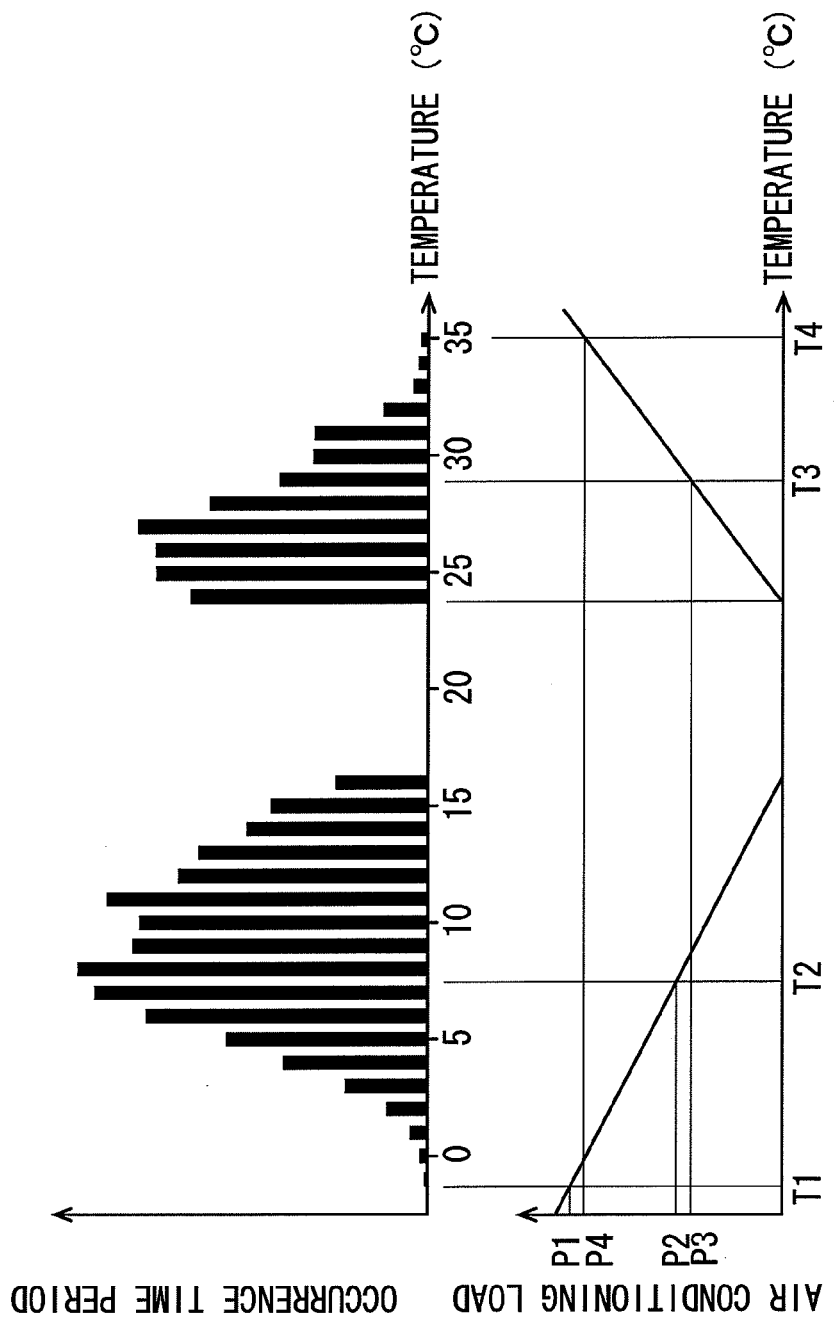
FIG. 5 is a diagram showing a time period during which each outside air temperature occurs in Japan, and the relationship between the outside air temperature and an air conditioning load.

FIG. 5 shows a time period during which each outside air temperature occurs in Japan, and the relationship between the outside air temperature and an air conditioning load. The air conditioning load shown in FIG. 5 is understood as a heating load when the outside air temperature is in a range lower than 20 degrees Celsius (hereinafter, omitted), and understood as a cooling load when the outside air temperature is in a range higher than 20 degrees. As illustrated in FIG. 5, in a heating operation, as the outside air temperature is lower, the heating load increases, and therefore the load of the inverter 4 increases. However, as shown in FIG. 5, a time period during which the outside air temperature is, for example, 5 degrees or less is relatively short throughout the year.

Accordingly, a time period in which a high value of the heating capacity is required is short. For example, if the capacity (herein, the heating capacity) exhibited by the air conditioning apparatus when the outside air temperature is about −1 degrees (T1) is defined as a rated heating capacity P1, an intermediate heating capacity P2 having half the value of the rated capacity is coincident with the capacity exhibited when the outside air temperature is 7 to 8 degrees (T2). A time period in which the operation is performed with the intermediate heating capacity P2 or less (a time period in which the outside air temperature is higher than 7 to 8° C.) is longer than a time period in which the operation is performed with the intermediate heating capacity P2 or more (a time period in which the outside air temperature is lower than 7 to 8° C.). In other words, throughout the year, the inverter 4 is frequently operated with the air conditioning load being equal to or less than the intermediate heating capacity P2.

On the other hand, in a cooling operation, as the outside air temperature is higher, a more cooling capacity is required. However, as illustrated in FIG. 5, a time period during which the outside air temperature is, for example, 33 degrees or higher is relatively short. Accordingly, a time period in which a high value of the cooling capacity is required is short. For example, if the capacity (herein, the cooling capacity) exhibited by the conditioning apparatus when the outside air temperature is about 35 degrees (T4) is defined as a rated cooling capacity P4, an intermediate cooling capacity P3 thereof is coincident with the capacity exhibited when the outside air temperature is about 29 degrees (T3). A time period in which the operation is performed with the intermediate cooling capacity P3 or less is relatively long.

As described above, in the air conditioning apparatus that is frequently operated with a load being medium or less, improvement in the electrical characteristics of the switching power supply circuit with respect to the load that is medium or less is particularly demanded, as compared with a case where the switching power supply circuit is adopted in other fields.

Therefore, this switching power supply circuit is controlled, for example, as follows. Here, a description will be given to an example case where the switching among the zeroth state, the first state, and the third state is performed in accordance with a load status. The load status is distinguished based on, for example, the current I. Accordingly, here, for example, the switching among the zeroth state, the first state, and the third state is performed in accordance with the magnitude of the current I.

Figure 6:
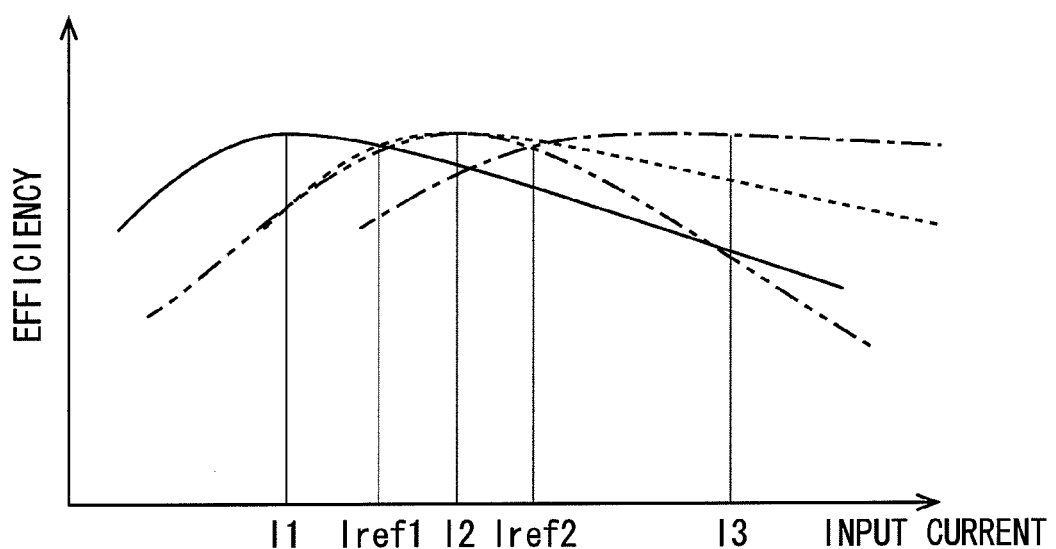
FIGS. 6 to 8 are diagrams schematically showing one example of the relationship of the efficiency relative to a current.

FIG. 6 shows one example of the relationship between the magnitude of the current I and the efficiency in each state. In the illustration of FIG. 6, the relationships of the current I to the efficiencies in the zeroth state, the first state, and the third state are indicated by the solid curved line, the broken curved line, and the alternate long and short dash curved line, respectively. These relationships can be obtained in advance by experiments or simulations. For example, the relationship in the zeroth state can be obtained by calculating the efficiency of the switching power supply circuit while changing the current I with all the switching elements S1, S2 kept non-conducting. The same is true for the first state and the third state.

As illustrated in FIG. 6, the efficiency in each state generally has an upwardly convex shape. A current value I1 that takes the peak of the efficiency in the zeroth state is lower than a current value I2 that takes the peak of the efficiency in the first state, and the current value I2 is lower than a current value I3 that takes the peak of the efficiency in the third state. Then, the efficiency in the zeroth state and the efficiency in the first state take the same value at a current value Iref1 that is higher than the current value I1 and lower than the current value I2. The efficiency in the first state and the efficiency in the third state take the same value at a current value Iref2 that is higher than the current value I2 and lower than the current value I3.

Accordingly, to enhance the efficiency in a wider range of currents, the switching among the zeroth state, the first state, and the third state is performed as follows. That is, when the current I is lower than the current value Iref1, the zeroth state is adopted by not operating the circuits 3a, 3b, that is, by keeping the switching elements S1, S2 non-conducting, and when the current I is higher than the current value Iref1, the first state is adopted by singularly operating the circuit 3a, that is, by repeatedly switching conducting/non-conducting of the switching element S1. When the current I is higher than the current value Iref2, the third state is adopted by cooperatively operating the circuits 3a, 3b, that is, by repeatedly switching conducting/non-conducting of the switching elements S1, S2. Thereby, as illustrated in FIG. 7, the efficiency can be enhanced in a wider range of the current I (in other words, in a wider range of the load).

Figure 7:
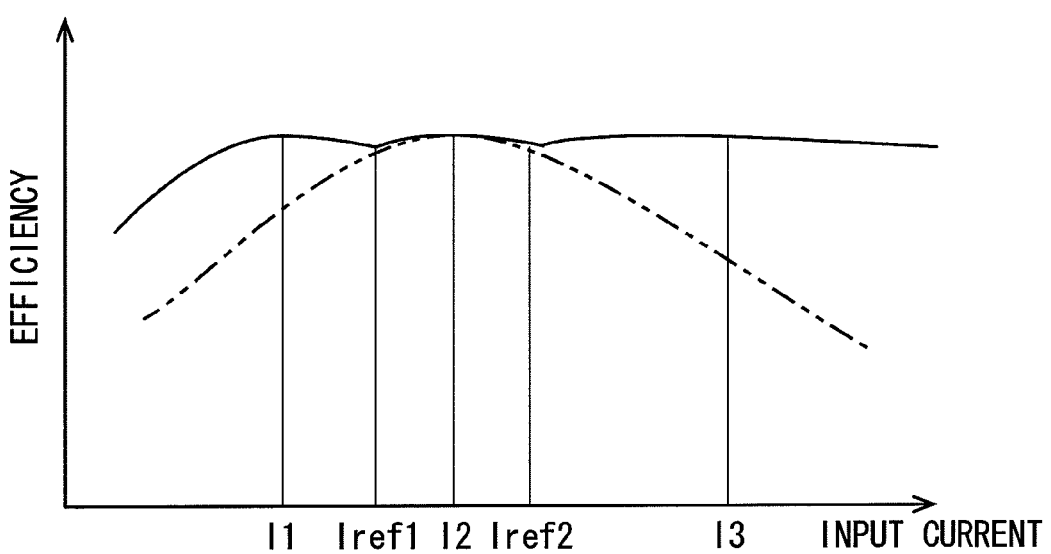

In the illustration of FIGS. 6 and 7, for the purpose of comparison, the relationship between the current and the efficiency in a switching power supply circuit having the single circuit 3a is indicated by the alternate long and two short dashes curved line. In the illustration of FIGS. 6 and 7, to enhance the efficiency in the entire region of the current I, a circuit constant of the switching power supply circuit is set such that the efficiency has its peak in the vicinity of the center thereof (in the vicinity of the current value I2). As understood from the illustration of FIGS. 6 and 7, the above-described control method can improve the efficiency in a wide range of the current I.

As described above, this control method can improve the efficiency in a wide range of the load. Particularly, by adopting the zeroth state when the current I is lower than the current value Iref1, the efficiency can be improved in a region where the load is low. Accordingly, this control method is particularly effective for an air conditioning apparatus that is frequently operated with an intermediate capacity or less.

When the current is coincident with the current value Iref1, either of the zeroth state and the first state may be adopted, and when the current is coincident with the current value Iref2, either of the first state and the third state may be adopted. Additionally, the criteria for switching the state are not necessarily the current values Iref1, Iref2, and a slight shift is allowed. Moreover, this control method is not limited to air conditioning apparatus, and may be adopted in a switching power supply circuit mounted on another apparatus.

Figure 8:
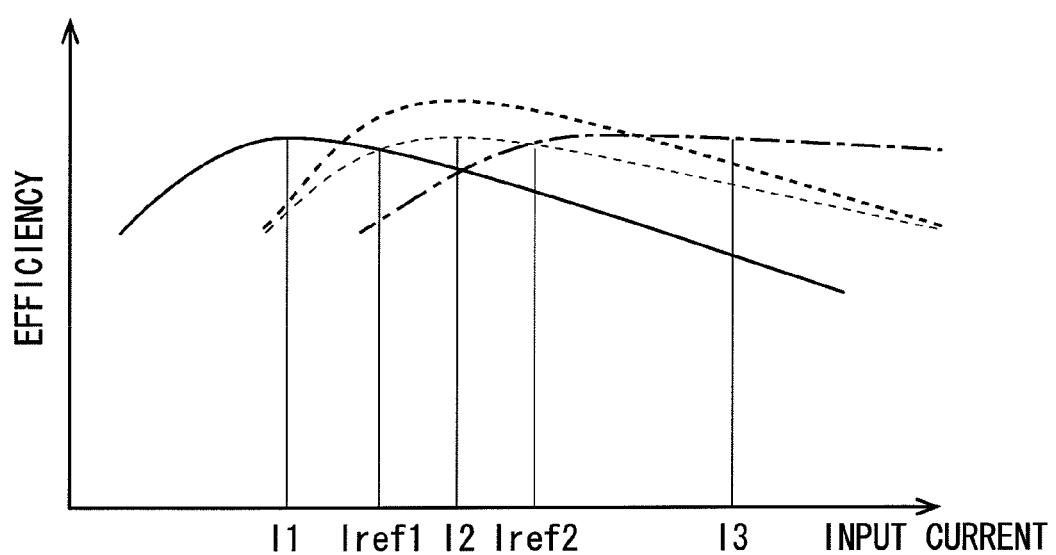

In a case where the switching element S1 is formed of, for example, a SiC semiconductor or a GaN semiconductor, the efficiency in the first state can be further improved as illustrated in FIG. 8. In the illustration of FIG. 8, the thin broken curved line indicates the efficiency obtained when the switching element S1 formed of a Si semiconductor is adopted, and the thick broken curved line indicates the efficiency obtained when the switching element S1 formed of a SiC semiconductor or a GaN semiconductor is adopted. The switching element S1 formed of a SiC semiconductor or a GaN semiconductor also enhances the efficiency in the third state, though not shown in FIG. 8.

<DC Voltage Command Value>

As described above, the control section 5 controls the switching elements S1, S2 based on the DC voltage command value that is the command value concerning the DC voltage between the output terminals P3, P4 in the first to the third states. In more detail, for example, the time periods in which the switching elements S1, S2 are conducting may be determined based on the DC voltage command value.

For example, in FIG. 7, the control section 5 adopts the first state when, for example, the current I is higher than the current value Iref1. At this time, it is preferable that the control section 5 adopts a first DC voltage command value A that is higher than the DC voltage between the output terminals P3, P4 in the zeroth state. The reason therefor is as follows. That is, with the current I being higher (that is, with the load being higher), a ripple in the DC voltage increases. An increase in the ripple in the DC voltage may cause an unstable operation of the circuit 3. To be more specific, there is a possibility that, for example, the DC voltage has a value lower than required by the inverter. In this control method, when the current I is higher than the current value Iref, the first DC voltage command value A that is still higher is adopted. This increases charges stored in the smoothing capacitor C1, and therefore can reduce a ripple in the DC voltage. As a result, a stable operation is achieved. On the other hand, as the DC voltage increases, a loss in the circuit 3 increases and thus the efficiency decreases. In this control method, when the current I is lower than the current value Iref, the DC voltage takes a value that is still lower. Therefore, the efficiency in this range can be improved. As described above, the efficiency of the circuit in a range where the current I is low is improved while a stable operation of the circuit 3 in a range where the current I is high is achieved.

In the same manner, it is desirable that a value higher than the first DC voltage command value A adopted in the first state is adopted as a second DC voltage command value B in the third state. This contributes to a stable operation of the circuit 3 in a state where the current I is higher than the current value Iref2. Moreover, as compared with a case where the second DC voltage command value B is adopted in a range where the current I is higher than the current value Iref1 and lower than the current value Iref2, the efficiency in this range is improved.

Furthermore, in this embodiment, the inverter 4 drives the motor. The efficiency of the motor decreases as the current I increases. This is because an increase in the current I increases a copper loss. However, by increasing the DC voltage, the copper loss can be decreased. Although an increase in the DC voltage decreases the efficiency of the circuit 3, the decrease in the efficiency of the motor caused thereby is smaller than the increase in the efficiency of the motor caused by decreasing the copper loss. As a result, the efficiency of the motor is improved. Accordingly, in a case where the inverter 4 drives the motor, adoption of this control method can suppress the decrease in the efficiency of the motor in a range where the current I is high, or can increase the efficiency of the motor. Additionally, as described above, this control method improves the efficiency of the circuit in a range where the current I is low, and consequently contributes to improvement in the efficiency of the motor in this range.

<Example of Operation of Circuits 3a, 3b Having Different Device Characteristics>

Next, a description will be given to an example of switching for cooperatively operating the circuits 3a, 3b having different device characteristics. In the following, the switching element S1 is defined as a master-side switching element, and the switching element S2 is defined as a slave-side switching element.

For example, in the switching power supply circuit of FIG. 2, the reactors L1, L2 have different impedances. Here, it is assumed that, for example, the inductance of the reactor L1 is twice the inductance of the reactor L2. Thus, the number of turns of a coil included in the reactor L2 can be half the number of turns of a coil included in the reactor L1. Therefore, downsizing of the reactor L2 is achieved, and the manufacturing cost is reduced.

Figure 9:
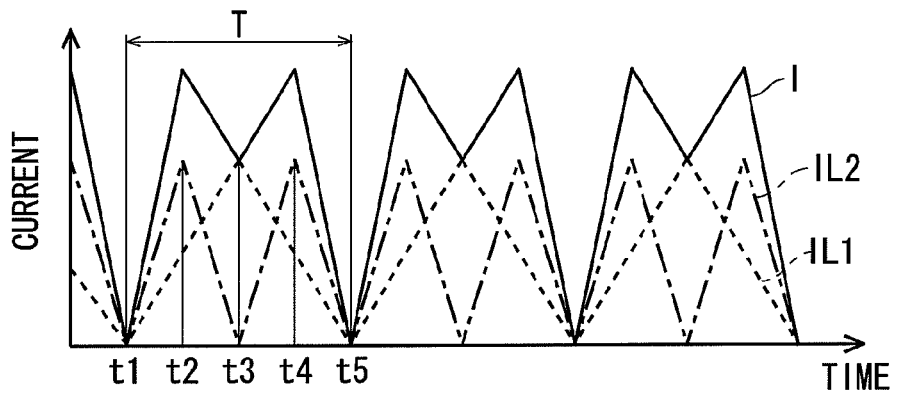
FIGS. 9 to 11 are conceptual diagrams showing one example of currents flowing in the reactors and the sum thereof.

FIG. 9 shows one example of the currents IL1, IL2, I in such a switching power supply circuit. In the circuit 3a, in an interval between a time t1 and a time t3, the switching signal is outputted to the switching element S1 to render the switching element S1 conducting. Accordingly, in the interval between the time t1 and the time t3, the current IL1 increases with a predetermined slope. Then, in an interval between the time t3 and a time t5, the output of the switching signal to the switching element S1 is stopped. Thereby, the switching element S1 is rendered non-conducting, and the current IL1 decreases with a predetermined slope. Since the current IL1 reaches zero at a time point of the time t5, the switching signal is outputted to the switching element S1 again, to render the switching element S1 conducting. Thereafter, in the circuit 3a, the above-described operation is repeated.

In FIG. 9, the slope of increase in the current IL1 and the slope of decrease in the current IL1 are, except for plus and minus, identical to each other. In other words, the current IL1 in a case where the time period in which the switching element S1 is conducting and the time period in which the switching element S1 is non-conducting are identical to each other is illustrated. Therefore, in the illustration of FIG. 9, in one cycle T that is the time period between the time t1 and the time t5, the current IL1 has the shape of an isosceles triangle.

In the circuit 3b, on the other hand, at the time t1, the switching signal is outputted to the switching element S2 to render the switching element S2 conducting. Accordingly, the current IL2 increases with a predetermined slope. The slopes of increase in the currents IL1, IL2 become smaller as the inductances of the reactors L1, L2 are higher. Here, the inductance of the reactor L2 is half the value of the inductance of the reactor L1, and therefore the slope of increase in the current IL2 (the ratio of increment thereof relative to time) is twice the slope of increase in the current IL1.

At a time t2 at which the maximum value of the current IL2 and the maximum value of the current IL1 are coincident with each other, the output of the switching signal to the switching element S2 is stopped. Thereby, the switching element S2 is rendered non-conducting, and the current IL2 decreases with a predetermined slope. The slopes of decreases in the currents IL1, IL2 also become smaller as the inductances of the reactors L1, L2 are higher, respectively. Here, the inductance of the reactor L2 is half the value of the inductance of the reactor L1, and therefore the slope of decrease in the current IL2 (the ratio of decrement thereof relative to time) is twice the slope of decrease in the current IL1.

In view of the relationships of the slopes of the currents IL1, IL2, the current IL2 reaches zero at a time point (that is, the time t3) when the half of one cycle T elapses. Then, at the time t3, the switching signal is outputted to the switching element S2 again, and the above-described operation is repeated.

Due to this cooperative operation of the circuits 3a, 3b, the current I (=IL1+IL2) flows in the diode rectifier circuit 2.

Since the currents IL1, IL2 have their valleys at the same time (for example, at the times t1, t5), the current I that is the sum of them also has its valley at this time. In other words, at this time, the minimum value of the current I is zero that is equal to the minimum values of the currents IL1, IL2. Additionally, at the times t2, t4, the maximum value of the current I takes a value higher than the maximum values of the currents IL1, IL2 (here, 1.5 times higher than those of the currents IL1, IL2). Thus, there is a large difference (here, 1.5 times the currents IL1, IL2) between the maximum value and the minimum value of the current I that is the sum of the currents IL1, IL2. Therefore, harmonics are likely to occur.

It may be also acceptable to shift the time points when the switching elements S1, S2 are rendered conducting. In other words, it may be acceptable to change a phase difference between the currents IL1, IL2. However, even if the phase difference is changed, the difference between the maximum value and the minimum value of the current I is not changed so much.

Figure 10:
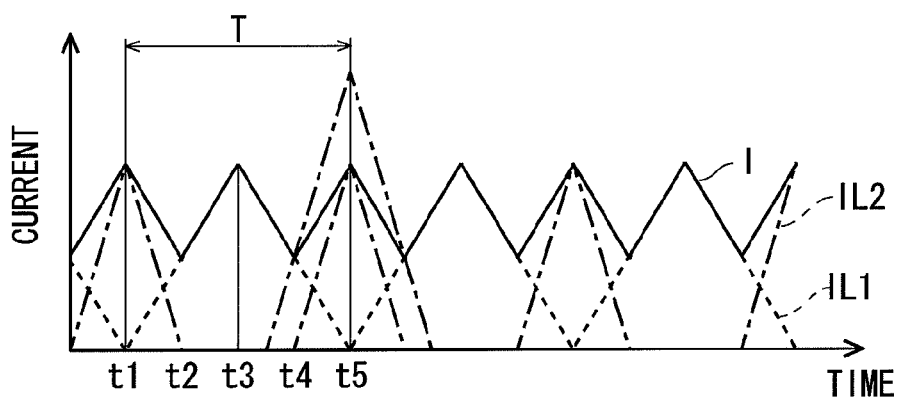

Therefore, it may be possible that, as shown in FIG. 10, the switching signal is outputted to the switching element S2 only in a time period from the time t4 to the time t5 during one cycle T from the time t1 to the time t5. This causes the current IL2 to make a peak in a time period in which the current IL1 makes a valley, and the current IL2 to be zero in a time period in which the current IL1 makes a peak. Thus, the difference between the maximum value and the minimum value of the current I that is the sum of the currents IL1, IL2 can be reduced. Here, the maximum value and the minimum value of the current I are equal to and 0.5 times the maximum value of the current IL1 (or the current IL2), respectively, and the difference therebetween is reduced to 0.5 times the maximum value of the current IL1 (or the current IL2).

In a case where the ratio of the inductances of the reactors L1, L2 is 2, as illustrated in FIG. 10, the switching element S2 is rendered conducting only in the last one-fourth of the one cycle T. In a case where the ratio of the inductance of the reactor L1 relative to the inductance of the reactor L2 is N (N is a number greater than 1), the switching element S2 may be rendered conducting only in the last one 2N-th of the one cycle T. In other words, the switching element S2 may be rendered conducting only in an interval between a third time point (t4) that is prior, by a time period corresponding to one N-th of the one cycle, to a second time point (t5), and the second time point (t5) that is the next time after the first time point (t1) to render the switching element S1 conducting.

For example, in the switching power supply circuit of FIG. 2, the reactors L1, L2 may have different inductances and different current capacities. Here, for example, it is assumed that the inductance of the reactor L1 is lower than the inductance of the reactor L2, and the current capacity of the reactor L1 is smaller than the current capacity of the reactor L2. This can make the wire diameter of a coil included in the reactor L2 smaller than the wire diameter of a coil included in the reactor L2. Accordingly, even though the reactor L2 has a high inductance, an increase in the size of the reactor L2 is suppressed, and additionally the manufacturing cost is reduced.

Figure 11:
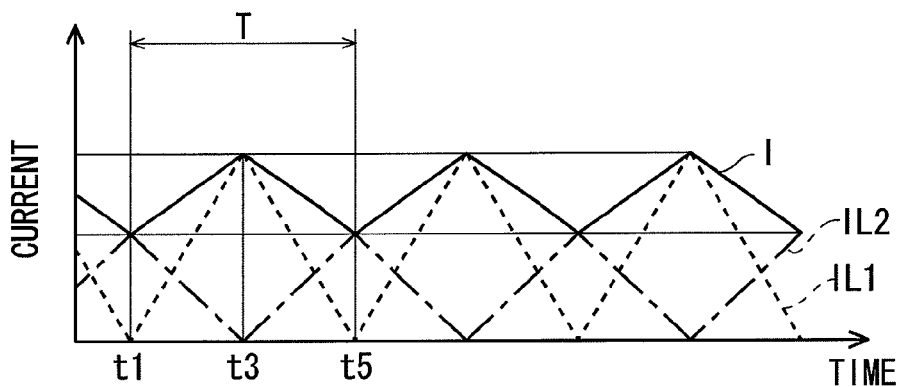

FIG. 11 shows one example of the currents IL1, IL2, I in such a switching power supply circuit. The switching of the switching element S1 of the circuit 3a is the same as the switching having been described with reference to FIG. 9.

On the other hand, to the switching element S2, the switching signal is outputted in a time period (that is, one half the cycle) from the time t3, that is when one half the cycle elapses after the time t1 at which the switching element S1 has been rendered conducting, to the time t5. In this manner, the switching element S2 is rendered conducting. Therefore, in the time period from the time t3 to the time t5, the current IL2 increases. However, since the inductance of the reactor L2 is higher than the inductance of the reactor L1, the slope of the current IL2 is smaller than the slope of the current IL1. Since the time period in which the switching element S1 is rendered conducting and the time period in which the switching element S2 is rendered conducting are the same, the maximum value of the current IL2 is lower than the maximum value of the current IL1.

Thus, even if the current capacity of the reactor L2 is smaller than the current capacity of the reactor L1, the circuits 3a, 3b can be cooperatively operated without causing a malfunction of the reactor L2. Needless to say, the current capacity of the reactor L2 is set larger than the current of the current IL2.

Here, also in the illustration of FIG. 11, it may be acceptable to shift the time points when the switching elements S1, S2 are rendered conducting. In other words, it may be acceptable to change the phase difference between the currents IL1, IL2.

Figure 12:
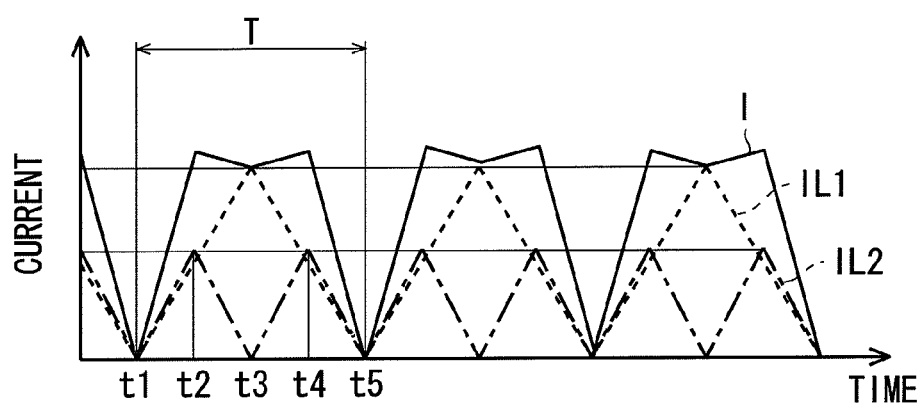
FIG. 12 is a conceptual diagram showing one example of currents.

For example, in the switching power supply circuit having been described with reference to FIG. 9, it may be possible to make the inductance of the reactor L2 closer to the inductance of the reactor L1. This reduces the slope of the current IL2, and thus reduces the maximum value of the current IL2. Such currents IL1, IL2, I are illustrated in FIG. 12. Along with the reduction in the maximum value of the current IL2, the maximum value of the current I is also reduced. Thereby, the difference between the maximum value and the minimum value of the current I is reduced, and additionally the current capacity of the reactor L2 is reduced.

Also in the illustration of FIG. 12, it may be acceptable to shift the time points when the switching elements S1, S2 are rendered conducting. In other words, it may be acceptable to change the phase difference between the currents IL1, IL2.

While the invention has been described in detail, the foregoing description is in all aspects illustrative and not restrictive. It is therefore understood that numerous modifications and variations, though not illustrated herein, can be devised without departing from the scope of the invention.

DESCRIPTION OF THE REFERENCE NUMERALS

D11, D12 diode
L1, L2 reactor
LH1, LH2, LL power supply line
P1, P2 input terminal
P3, P4 output terminal
S1, S2 switching element
The invention claimed is:

1. A switching power supply circuit comprising:
first and second input terminals;
first and second output terminals;
a second power supply line connecting said second input terminal and said second output terminal to each other; and
a plurality of circuits, each of said plurality of circuits including:
  a first power supply line connecting said first input terminal and said first output terminal to each other;
  a reactor provided on said first power supply line;
  a diode connected in series with said reactor on said first power supply line and arranged with an anode thereof directed toward said reactor; and
  a switching element provided between said second power supply line and a point between said reactor and said diode; and
a controller adapted to perform a method for control of the switching power supply circuit when a DC voltage is applied between the first and second input terminals thereby causing a non-zero input current to flow in said first and second input terminals, the method comprising:
  when the input current flowing in said first and second input terminals is less than a first predetermined value and more than zero, keeping said switching element belonging to each of said plurality of circuits non-conducting; and
  when the input current flowing in said first and second input terminals exceeds the first predetermined value, repeatedly switching conducting/non-conducting of said switching element belonging to said one of said plurality of circuits,
wherein characteristics of said reactor of one of said plurality of circuits and said reactor of another of said plurality of circuits are different from each other, or characteristics of said switching element of said one of said plurality of circuits and said switching element of said another of said plurality of circuits are different from each other, or characteristics of said diode of said one of said plurality of circuits and said diode of said another of said plurality of circuits are different from each other.

2. The switching power supply circuit according to claim 1, wherein
said switching element belonging to said one of said plurality of circuits is an insulated gate bipolar transistor, and said switching element belonging to said another of said plurality of circuits is a MOS field effect transistor.

3. The switching power supply circuit according to claim 2, wherein
an impedance of said reactor belonging to said one of said plurality of circuits is lower than an impedance of said reactor belonging to said another of said plurality of circuits.

4. The switching power supply circuit according to claim 1, wherein
said switching element belonging to said one of said plurality of circuits is formed of a silicon carbide semiconductor or a gallium nitride semiconductor, and said switching element belonging to said another of said plurality of circuits is formed of a silicon semiconductor.

5. The switching power supply circuit according to claim 3, wherein
an impedance of said reactor belonging to said one of said plurality of circuits is lower than an impedance of said reactor belonging to said another of said plurality of circuits.

6. The switching power supply circuit according to claim 1, wherein
an impedance of said reactor belonging to said one of said plurality of circuits is lower than an impedance of said reactor belonging to said another of said plurality of circuits.

7. A method for control of a switching power supply which comprises:
first and second input terminals;
first and second output terminals;
a second power supply line connecting said second input terminal and said second output terminal to each other; and
a plurality of circuits,
wherein
each of said plurality of circuits includes:
  a first power supply line connecting said first input terminal and said first output terminal to each other;
  a reactor provided on said first power supply line;
  a diode connected in series with said reactor on said first power supply line and arranged with an anode thereof directed toward said reactor; and a switching element provided between said second power supply line and a point between said reactor and said diode, wherein characteristics of said reactor of one of said plurality of circuits and said reactor of another of said plurality of circuits are different from each other, or characteristics of said switching element of said one of said plurality of circuits and said switching element of said another of said plurality of circuits are different from each other, or characteristics of said diode of said one of said plurality of circuits and said diode of said another of said plurality of circuits are different from each other, said method comprising performing:

a first step of, when the input current flowing in said first and second terminals is less than a first predetermined value and more than zero, keeping said switching element belonging to each of said plurality of circuits non-conducting; and a second step of, when a current flowing in said first and second input terminals exceeds the first predetermined value, repeatedly switching conducting/non-conducting of said switching element belonging to said one of said plurality of circuits.

8. A method for control of a switching power supply circuit which comprises:

first and second input terminals;
first and second output terminals;
a second power supply line connecting said second input terminal and said second output terminal to each other; and
a plurality of circuits, each including:
  a first power supply line connecting said first input terminal and said first output terminal to each other;
  a reactor provided on said first power supply line;
  a diode connected in series with said reactor on said first power supply line and arranged with an anode thereof directed toward said reactor; and
  a switching element provided between said second power supply line and a point between said reactor and said diode, wherein characteristics of said reactor of one of said plurality of circuits and said reactor of another of said plurality of circuits are different from each other, or characteristics of said switching element of said one of said plurality of circuits and said switching element of said another of said plurality of circuits are different from each other, or characteristics of said diode of said one of said plurality of circuits and said diode of said another of said plurality of circuits are different from each other, said method comprising performing:

a first step of keeping said switching element belonging to each of said plurality of circuits non-conducting; and a second step of, when a current flowing in said first and second input terminals exceeds a first predetermined value, repeatedly switching conducting/non-conducting of said switching element belonging to said one of said plurality of circuits, wherein in said second step, the conducting/non-conducting of said switching element belonging to said one of said plurality of circuits is repeatedly switched based on a first DC voltage command value that is higher than a voltage between said first and second output terminals in said first step.

9. The method for control of the switching power supply circuit according to claim 8, further comprising performing a third step of, when the current flowing in said first and second input terminals exceeds a second predetermined value that is higher than said first predetermined value, repeatedly switching conducting/non-conducting of said switching element of said one of said plurality of circuits and said switching element of said another of said plurality of circuits.

10. The method for control of the switching power supply circuit according to claim 9, wherein in said third step, the conducting/non-conducting of said switching element of said one of said plurality of circuits and said switching element of said another of said plurality of circuits is repeatedly switched based on a second DC voltage command value that is higher than said first DC voltage command value.

11. The method for control of the switching power supply circuit according to claim 10, further comprising, prior to said first step and said second step, performing:

a fourth step of keeping said switching element belonging to each of said plurality of circuits non-conducting, and obtaining a first relationship between said current and an efficiency of said switching power supply circuit; and a fifth step of repeatedly switching conducting/non-conducting of said switching element of said one of said plurality of circuits based on said first DC voltage command value, and obtaining a second relationship between said current and the efficiency of said switching power supply circuit, wherein the current that gives the same efficiency both in said first relationship and in said second relationship is adopted as said first predetermined value.

12. The method for control of the switching power supply circuit according to claim 9, further comprising, prior to said first step and said second step, performing:

a fourth step of keeping said switching element belonging to each of said plurality of circuits non-conducting, and obtaining a first relationship between said current and an efficiency of said switching power supply circuit; and a fifth step of repeatedly switching conducting/non-conducting of said switching element of said one of said plurality of circuits based on said first DC voltage command value, and obtaining a second relationship between said current and the efficiency of said switching power supply circuit, wherein the current that gives the same efficiency both in said first relationship and in said second relationship is adopted as said first predetermined value.

13. The method for control of the switching power supply circuit according to claim 8, further comprising, prior to said first step and said second step, performing:

a fourth step of keeping said switching element belonging to each of said plurality of circuits non-conducting, and obtaining a first relationship between said current and an efficiency of said switching power supply circuit; and a fifth step of repeatedly switching conducting/non-conducting of said switching element of said one of said plurality of circuits based on said first DC voltage command value, and obtaining a second relationship between said current and the efficiency of said switching power supply circuit, wherein the current that gives the same efficiency both in said first relationship and in said second relationship is adopted as said first predetermined value.

14. A method for control of a switching power supply circuit which comprises:

first and second input terminals;
first and second output terminals;
a second power supply line connecting said second input terminal and said second output terminal to each other; and
a plurality of circuits, each including:
   a first power supply line connecting said first input terminal and said first output terminal to each other;
   a reactor provided on said first power supply line;
   a diode connected in series with said reactor on said first power supply line and arranged with an anode thereof directed toward said reactor; and
   a switching element provided between said second power supply line and a point between said reactor and said diode,
wherein characteristics of said reactor of one of said plurality of circuits and said reactor of another of said plurality of circuits are different from each other, or characteristics of said switching element of said one of said plurality of circuits and said switching element of said another of said plurality of circuits are different from each other, or characteristics of said diode of said one of said plurality of circuits and said diode of said another of said plurality of circuits are different from each other,
said method comprising performing:
a first step of keeping said switching element belonging to each of said plurality of circuits non-conducting;
a second step of, when a current flowing in said first and second input terminals exceeds a first predetermined value, repeatedly switching conducting/non-conducting of said switching element belonging to said one of said plurality of circuits; and
a third step of, when the current flowing in said first and second input terminals exceeds a second predetermined value that is higher than said first predetermined value, repeatedly switching conducting/non-conducting of said switching element of said one of said plurality of circuits and said switching element of said another of said plurality of circuits.

15. The method for control of the switching power supply circuit according to claim 14, further comprising, prior to said first step and said second step, performing:
a fourth step of keeping said switching element belonging to each of said plurality of circuits non-conducting, and obtaining a first relationship between said current and an efficiency of said switching power supply circuit; and
a fifth step of repeatedly switching conducting/non-conducting of said switching element of said one of said plurality of circuits based on a first DC voltage command value, and obtaining a second relationship between said current and the efficiency of said switching power supply circuit,
wherein the current that gives the same efficiency both in said first relationship and in said second relationship is adopted as said first predetermined value.

16. A method for control of a switching power supply which comprises:
first and second input terminals;
first and second output terminals;
a second power supply line connecting said second input terminal and said second output terminal to each other; and
a plurality of circuits, each including:
   a first power supply line connecting said first input terminal and said first output terminal to each other;
   a reactor provided on said first power supply line;
   a diode connected in series with said reactor on said first power supply line and arranged with an anode thereof directed toward said reactor; and
   a switching element provided between said second power supply line and a point between said reactor and said diode,
wherein characteristics of said reactor of one of said plurality of circuits and said reactor of another of said plurality of circuits are different from each other, or characteristics of said switching element of said one of said plurality of circuits and said switching element of said another of said plurality of circuits are different from each other, or characteristics of said diode of said one of said plurality of circuits and said diode of said another of said plurality of circuits are different from each other,
said method comprising performing:
a first step of keeping said switching element belonging to each of said plurality of circuits non-conducting; and
a second step of, when a current flowing in said first and second input terminals exceeds a first predetermined value, repeatedly switching conducting/non-conducting of said switching element belonging to said one of said plurality of circuits,
wherein said method further comprises, prior to said first step and said second step, performing:
a fourth step of keeping said switching element belonging to each of said plurality of circuits non-conducting, and obtaining a first relationship between said current and an efficiency of said switching power supply circuit; and
a fifth step of repeatedly switching conducting/non-conducting of said switching element of said one of said plurality of circuits based on a first DC voltage command value, and obtaining a second relationship between said current and the efficiency of said switching power supply circuit,
wherein the current that gives the same efficiency both in said first relationship and in said second relationship is adopted as said first predetermined value.

\* \* \* \* \*